(12) United States Patent
Sangireddi et al.

(10) Patent No.: US 11,387,895 B2
(45) Date of Patent: Jul. 12, 2022

(54) COMMUNICATION METHOD AND COMMUNICATION SYSTEM

(71) Applicant: Hughes Network Systems, LLC, Germantown, MD (US)

(72) Inventors: Chandrasekhar Sangireddi, Germantown, MD (US); Sandeep Ahluwalia, Germantown, MD (US); Charles Barnett, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 60 days.

(21) Appl. No.: 16/236,973

(22) Filed: Dec. 31, 2018

(65) Prior Publication Data

US 2020/0212998 A1  Jul. 2, 2020

(51) Int. Cl.
*H04B 7/185* (2006.01)
*H04W 80/02* (2009.01)
*H04W 76/30* (2018.01)
*H04W 76/11* (2018.01)
*H04W 76/12* (2018.01)

(52) U.S. Cl.
CPC ..... *H04B 7/18517* (2013.01); *H04B 7/18582* (2013.01); *H04W 76/11* (2018.02); *H04W 76/12* (2018.02); *H04W 76/30* (2018.02); *H04W 80/02* (2013.01)

(58) Field of Classification Search
CPC .. H04B 7/18517; H04W 76/12; H04W 76/30; H04W 76/11
See application file for complete search history.

(56) References Cited

U.S. PATENT DOCUMENTS

| 2008/0025312 A1* | 1/2008 | Kuppuswamy | H04W 28/06 370/392 |
| 2011/0044279 A1* | 2/2011 | Johansson | H04L 45/74 370/329 |
| 2016/0006500 A1* | 1/2016 | Radpour | H04B 7/18539 370/319 |
| 2016/0192235 A1* | 6/2016 | Ahluwalia | H04L 69/22 370/329 |

* cited by examiner

*Primary Examiner* — Faruk Hamza
*Assistant Examiner* — Alan L Lindenbaum
(74) *Attorney, Agent, or Firm* — Global IP Counselors, LLP

(57) ABSTRACT

A communication method includes receiving, by a first node of a satellite communications network, a stream of terrestrial data packets that are encapsulated in accordance with a predetermined protocol, de-encapsulating, by the first node, the terrestrial data packets to extract user plane context and QoS parameters for a user session in accordance with the predetermined protocol, encapsulating, by the first node, the user plane context within satellite data packets, and transmitting, by the first node, the satellite data packets to a second node of the satellite communications network via a satellite communications link between the first node and the second node by scheduling the satellite data packets using the QoS parameters in accordance with the predetermined protocol.

20 Claims, 10 Drawing Sheets

COMMUNICATION METHOD AND COMMUNICATION SYSTEM

BACKGROUND

Field of the Invention

The present invention generally relates to a communication method. More specifically, the present invention relates to a communication method for a communications network with a satellite backhaul link. Also, the present invention generally relates to a communication system.

Background Information

Generally, cellular network communications, such as the Fourth Generation (4G) and the Fifth Generation (5G), provide data intensive multimedia services (e.g., voice, data, video, images, etc.) to end users. The cellular network communications are desired to support the demands and traffic loads of such multimedia services. However, this requires a significant amount of network bandwidth.

Satellite backhaul links for the cellular network communications are becoming favorable to support such requirements. Satellite backhaul links are basically feasible and cost effective relative to dedicated terrestrial backhaul links (e.g. fiber or cable) between core network and remote base stations (NodeB). The satellite backhaul links can generally provide sufficient bandwidth to support the demands and traffic loads of multimedia services.

SUMMARY

It is desirable that satellite bandwidth of the satellite backhaul links are efficiently utilized. In particular, in a satellite cellular backhaul deployment, DSCP (Differentiated Services Code Point) markings of terrestrial IP packets for the cellular network communications can be used to differentiate different types of traffic while scheduling traffic over the satellite backhaul link. The DSCP markings can help identify type of traffic, such as guaranteed, not-guaranteed and few additional levels, for prioritizing one type over another type. However, it has been discovered that with the DSCP markings, aggregated traffic across all UEs (User Equipment) per traffic type will be scheduled without considering individual UE QoS (Quality of Service) needs, which leads to situations where terrestrial traffic of a UE with lower service plan may get better treatment over the satellite backhaul link than another UE with a better service plan. It has also been discovered that if entire terrestrial IP packets with SCTP, UDP and IP headers are transported over the satellite backhaul link, then this uses up extra satellite bandwidth, which results in inefficient use of satellite bandwidth.

One object is to provide a communication method for a communications network with a satellite backhaul link, with which satellite bandwidth can be efficiently utilized.

In view of the state of the known technology, a communication method is provided that includes receiving, by a first node of a satellite communications network, a stream of terrestrial data packets that are encapsulated in accordance with a predetermined protocol, de-encapsulating, by the first node, the terrestrial data packets to extract user plane context and QoS parameters for a user session in accordance with the predetermined protocol, encapsulating, by the first node, the user plane context within satellite data packets, and transmitting, by the first node, the satellite data packets to a second node of the satellite communications network via a satellite communications link between the first node and the second node by scheduling the satellite data packets using the QoS parameters in accordance with the predetermined protocol.

Also, in view of the state of the known technology, a communication method is provided that includes receiving, by a first node of a satellite communications network, a stream of terrestrial data packets that are encapsulated in accordance with a predetermined protocol, de-encapsulating, by the first node, the terrestrial data packets to extract payload information by stripping header information, encapsulating, by the first node, the payload information within satellite data packets by adding to the payload information header information having a smaller data size than the header information that has been stripped from the terrestrial data packets, and transmitting, by the first node, the satellite data packets to a second node of the satellite communications network via a satellite communications link between the first node and the second node.

Also, in view of the state of the known technology, a communication system is provided that includes a first node of a satellite communications network and a second node of the satellite communications network. The second node is configured to link with the first node via a satellite communications link between the first node and the second node. The first node includes a proxy device, a packet scheduler and a transmitter. The proxy device is configured to receive a stream of terrestrial data packets that are encapsulated in accordance with a predetermined protocol, configured to de-encapsulate the terrestrial data packets to extract user plane context and QoS parameters for a user session in accordance with the predetermined protocol, and configured to encapsulate the user plane context within satellite data packets. The packet scheduler is configured to schedule the satellite data packets using the QoS parameters in accordance with the predetermined protocol. The transmitter is configured to transmit the satellite data packets to the second node via the satellite communications link according to a scheduling result by the packet scheduler.

Also, in view of the state of the known technology, a communication system is provided that includes a first node of a satellite communications network, and a second node of the satellite communications network. The second node is configured to link with the first node via a satellite communications link between the first node and the second node. The first node includes a proxy device and a transmitter. The proxy device is configured to receive a stream of terrestrial data packets that are encapsulated in accordance with a predetermined protocol, configured to de-encapsulate the terrestrial data packets to extract payload information by stripping header information, and configured to encapsulate the payload information within satellite data packets by adding to the payload information header information having a smaller data size than the header information that has been stripped from the terrestrial data packets. The transmitter is configured to transmit the satellite data packets to the second node via the satellite communications link.

Also, other features, aspects and advantages of the disclosed communication method and the disclosed communication system will become apparent to those skilled in the field of the communication method and the communication system from the following detailed description, which, taken in conjunction with the annexed drawings, discloses several illustrative embodiments of a communication method and a communication system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
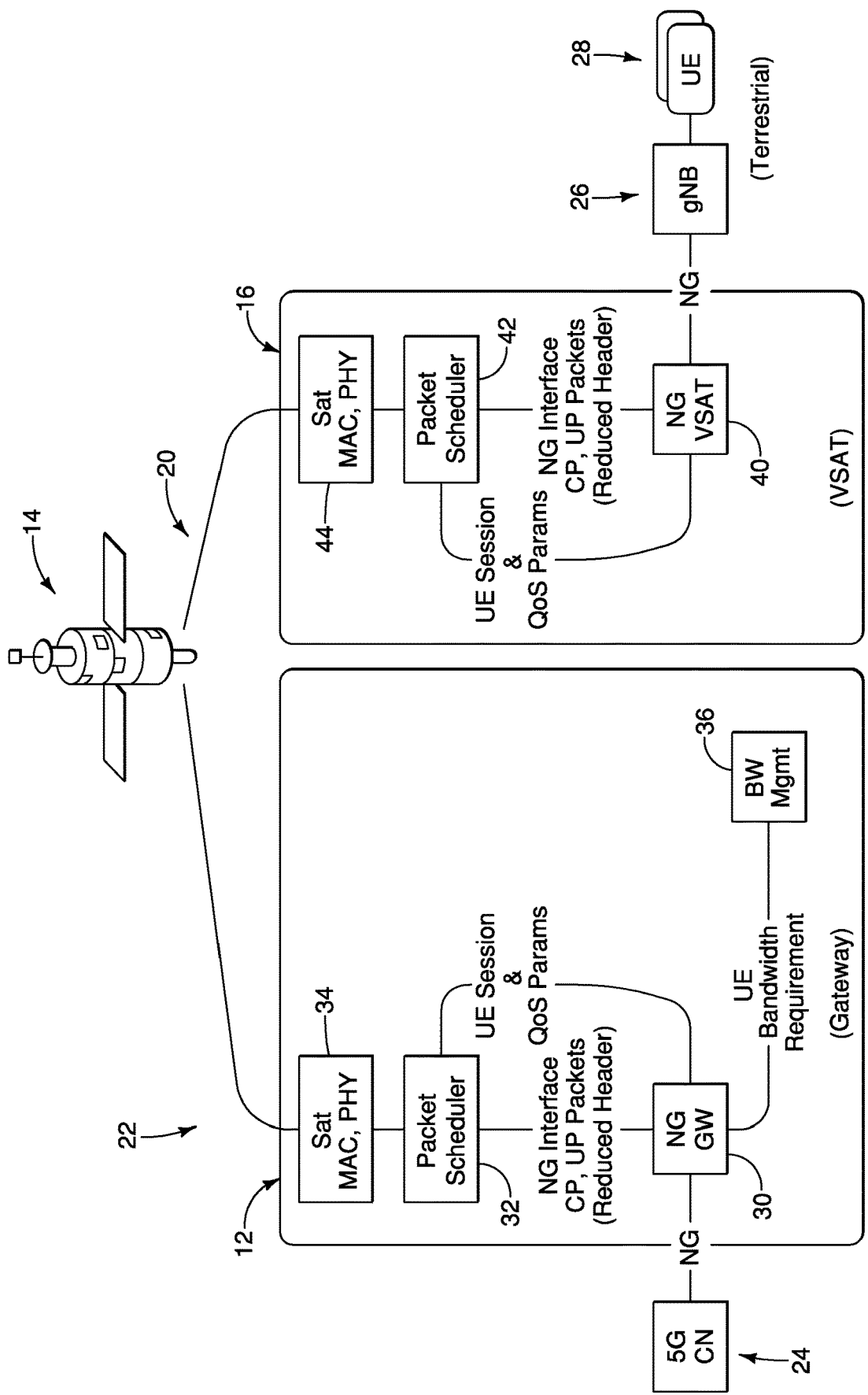
FIG. 1 illustrates an example of a communication system in accordance with one embodiment.

FIG. 1 illustrates an example of a communication system 10 according to an exemplary embodiment. In the illustrated embodiment, as shown in FIG. 1, the communication system 10 typically includes a terrestrially mounted satellite gateway or hub 12 (e.g., a first node) that communicates with an orbiting satellite 14, and a VSAT (Very Small Aperture Terminals) 16 (e.g., a second node) that links with the satellite gateway 12 via the orbiting satellite 14. In particular, the satellite gateway 12 and the VSAT 16 link with each other via a satellite communications link 20. In the illustrated embodiment, the satellite communications link 20 forms a satellite backhaul link of a communications network 22 (e.g., a satellite communications network) established between a terrestrial Core Network 24 and a terrestrial base station or NodeB (gNB) 26. Specifically, the satellite communications link 20 is a radio frequency link, such as a Ku-band link, a Ka-band link or any other suitable type of link as understood in the field of the satellite communication. The features described herein can be implemented, for example, in the Jupiter system by Hughes Network Systems, LLC. However, the features described herein can also be implemented any other non-terrestrial system providing a non-terrestrial backhaul link for cellular network communications.

In the illustrated embodiment, the Core Network 24 is configured as a 3GPP 5G Core Network (5GC), for example. Thus, the features of the present disclosure described herein are explained using 3GPP 5G model and terminology. However, these features of the present disclosure can be similarly implemented for a 4G network. Also, in the illustrated embodiment, the gNB 26 is a communications node in the communications network 22. The gNB 26 provides terrestrial connections between a plurality of user equipment (UEs) 28 and the Core Network 24 via the communication system 10. The UEs 28 include a device, such as a mobile phone, a mobile terminal and the like, for allowing a user to access to network services provided by the Core Network 24. In the illustrated embodiment, the communication system 10 is illustrated as having one VSAT 16 linked relative to one satellite gateway 12. However, a plurality of VSATs 16 can be linked relative to one satellite gateway 12. Also, in the illustrated embodiment, one gNB 26 is linked to one VSAT 16. However, a plurality of gNBs 26 can be linked relative to one VSAT 16.

Referring to FIG. 1, the satellite gateway 12 includes an NG-GW proxy (e.g., a proxy device) 30 and a packet scheduler 32. The satellite gateway 12 also includes a satellite MAC and PHY layer resource 34 (e.g., a transmitter) and a bandwidth manager 36. In the illustrated embodiment, the NG-GW proxy 30, the packet scheduler 32 and the bandwidth manager 36 include one or more electronic controllers or processors, for example. The satellite MAC and PHY layer resource 34 includes a satellite transceiver that establishes the radio frequency link with the orbiting satellite 14. The operations of the NG-GW proxy 30, the packet scheduler 32, the satellite MAC and PHY layer resource 34 and the bandwidth manager 36 will be described in detail later. The satellite gateway 12 can also include other types of equipment, such as amplifiers, waveguides, an antenna dish, as understood in the field of the satellite communication.

Referring to FIG. 1, the VSAT 16 includes an NG-VSAT proxy (e.g., a proxy device) 40 and a packet scheduler 42. The VSAT 16 also includes a satellite MAC and PHY layer resource 44 (e.g., a transmitter). In the illustrated embodiment, the NG-VSAT proxy 40 and the packet scheduler 42 include one or more electronic controllers or processors, for example. The satellite MAC and PHY layer resource 44 includes a satellite transceiver that establishes the radio frequency link with the orbiting satellite 14. The operations of the NG-VSAT proxy 40, the packet scheduler 42 and the satellite MAC and PHY layer resource 44 will be described in detail later. The VSAT 16 can also include other types of equipment, such as amplifiers, waveguides, an antenna dish, as understood in the field of the satellite communication.

Figure 2:
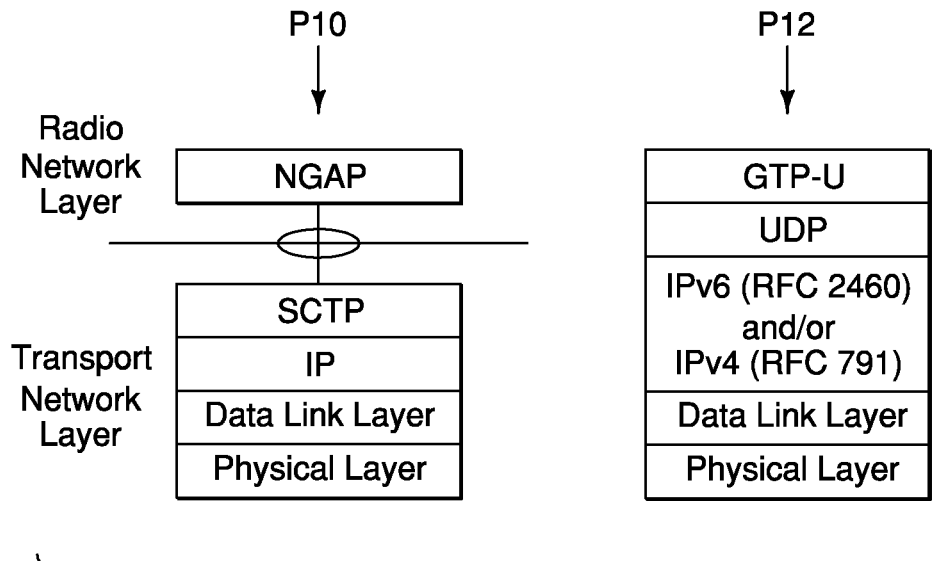
FIG. 2 illustrates 3GPP NG interface control and user plane protocol stack.
Figure 3:
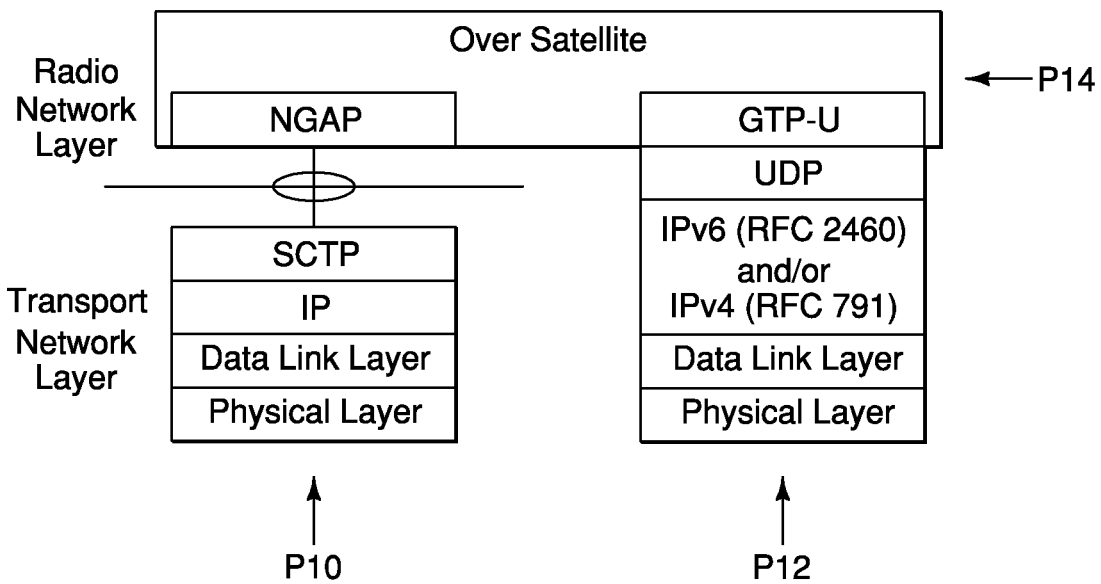
FIG. 3 illustrates NG interface control and user plane upper layer packet payload transported over satellite communications link.

Referring now to FIGS. 2 and 3, data structure transported over the communications network 22 between the Core Network 24 and the gNB 26 will be explained.

In the illustrated embodiment, NG (Next Generation) interface control and user plane between the Core Network 24 and the gNB 26 are extended over satellite by using proxies locally provided at the satellite gateway 12 and the VSAT 16 as illustrated in FIG. 1. Specifically, the NG-GW proxy 30 of the satellite gateway 12 supports the NG interface (control and user plane protocol stack) with the Core Network 24 and the NG-VSAT proxy 40 of the VSAT 16 supports the NG interface with the gNB 26 at the remote site.

More specifically, in the illustrated embodiment, the satellite gateway 12 and the VSAT 16 implement 3GPP core network interface protocol between the Core Network 24 and the gNB 26 with local proxies (i.e., the NG-GW proxy 30 and the NG-VSAT proxy 40). Therefore, in the illustrated embodiment, as illustrated in FIG. 2, the control plane protocol stack P10 of the NG interface and the user plane protocol stack P12 of the NG interface, which are defined between 5GC and NG-RAN (NG Radio Access Network) according to the 3GPP specifications, are also utilized between the Core Network 24 and the NG-GW proxy 30 of the satellite gateway 12 and between the NG-VSAT proxy 40 of the VSAT 16 and the gNB 26. Also, according to the 3GPP specifications, the NG-RAN and 5GC functions are separated from transport layer functions.

With the control plane protocol stack P10, the transport network layer is built on IP (Internet Protocol) transport, as shown in FIG. 2. SCTP (Stream Control Transmission Protocol) is added on top of IP. As defined in the 3GPP specifications, NGAP (NG Application Protocol) is used to establish control plane context between the NG-RAN and 5GC. NGAP is separated from transport layer SCTP/IP. NGAP uses separate identifiers for identifying 5GC (AMF (Authentication Management Field)) and NG-RAN nodes, UEs and data sessions of a UE. These identifiers are not tied to the transport layer SCTP. NGAP provides support for NG Interface Management Procedures, UE Context Management Procedures, PDU (Protocol Data Unit) Session Managements Procedures, and other procedures.

With the user plane protocol stack P12, the transport network layer is built on IP transport and GTP-U (GPRS Tunneling Protocol) is used on top of UDP (User Datagram Protocol)/IP to carry the user plane PDUs. Data streams are identified by source and destination TEIDs (Tunnel Endpoint Identifier) separating data from transport layer UDP/IP.

If the entire control plane packets with the SCTP and IP headers (i.e., entire terrestrial IP packet with SCTP and IP headers) or the entire user plane packets with the GTP-U, UDP and IP headers (i.e., entire terrestrial IP packet with the GTP-U, UDP and IP headers) are transported between the Core Network 24 and the gNB 26 over the satellite communications link 20, then this uses up extra satellite bandwidth, which results in inefficient use of the satellite bandwidth.

However, in the illustrated embodiment, as illustrated in FIG. 3, only upper layer packet payload P14 of the control plane protocol stack P10 and the user plane protocol stack P12 are transported over the satellite communications link 20. In particular, NG interface CP packets (e.g., satellite data packets) including the NGAP packet payload with reduced or compressed headers and NG interface UP packets (e.g., satellite data packets) including GTP-U packet payload with reduced or compressed headers are transported over the satellite communications link 20 by excluding the SCTP, UDP and IP headers used by the lower layers.

Figure 4:
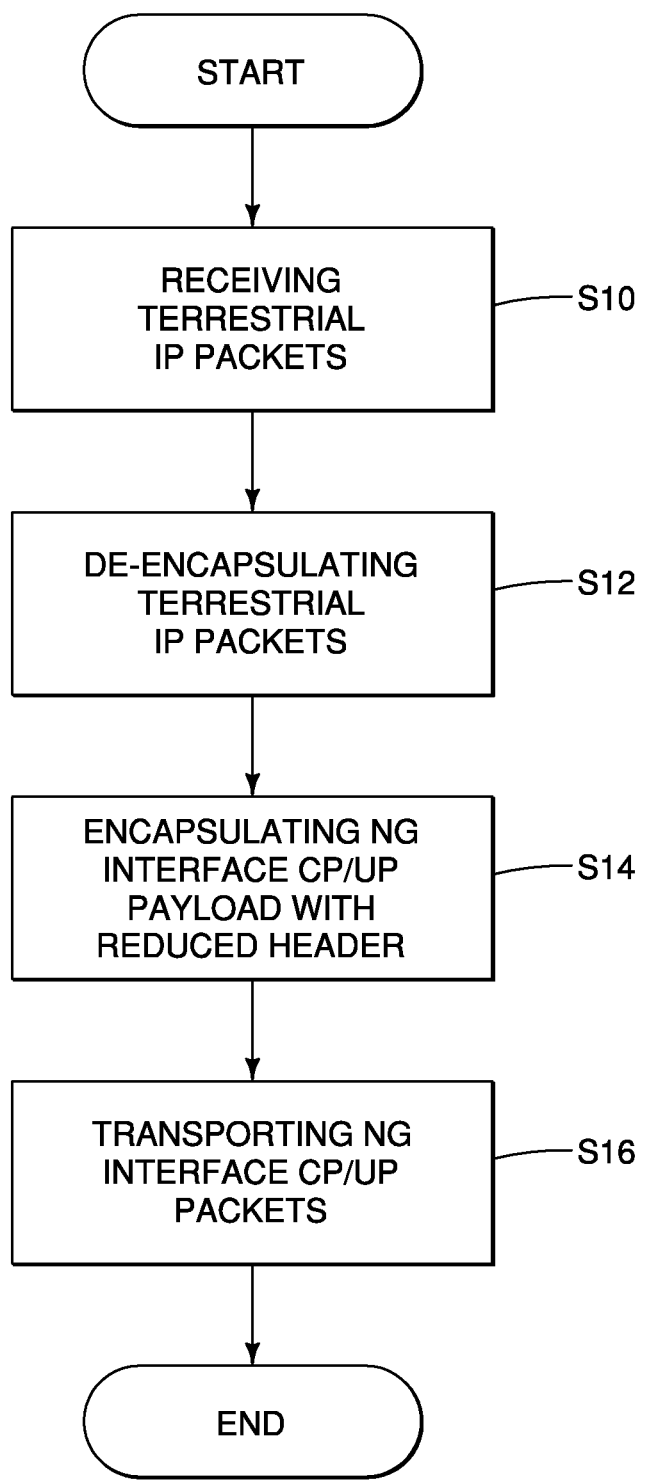
FIG. 4 illustrates a flowchart of a communication method of the communication system for transporting NG interface CP packets and NG interface UP packets over the satellite communications link.

FIG. 4 illustrates a flowchart of a communication method of the communication system 10 for transporting the NG interface CP packets and the NG interface UP packets over the satellite communications link 20. Specifically, the NG-GW proxy 30 of the satellite gateway 12 (or the NG-VSAT proxy 40 of the VSAT 16) receives from the Core Network 24 (or gNB 26) the terrestrial IP packets (e.g., a stream of terrestrial data packets) that are encapsulated in accordance with the 3GPP specifications (e.g., a predetermined protocol) (step S10). The NG-GW proxy 30 of the satellite gateway 12 (or the NG-VSAT proxy 40 of the VSAT 16) de-encapsulates the terrestrial IP packets to extract the NGAP packet payload or the GTP-U packet payload (e.g., the payload information) by stripping the SCTP, UDP and IP headers (e.g., the header information) (step S12). Then, the NG-GW proxy 30 of the satellite gateway 12 (or the NG-VSAT proxy 40 of the VSAT 16) encapsulates NG interface CP payload or the NG interface UP payload with reduced header (step S14). In particular, the NG-GW proxy 30 of the satellite gateway 12 (or the NG-VSAT proxy 40 of the VSAT 16) encapsulates the NGAP packet payload or the GTP-U packet payload within the NG interface CP packets or the NG interface UP packets by adding the reduced or compressed headers having a smaller data size than the SCTP, UDP and IP headers to the NGAP packet payload or the GTP-U packet payload (step S14). In particular, the NG-GW proxy 30 of the satellite gateway 12 (or the NG-VSAT proxy 40 of the VSAT 16) reconstructs transport layer headers just necessary for sending the NG interface CP packets and the NG interface UP packets to the NG-VSAT proxy 40 of the VSAT 16 (or the NG-GW proxy 30 of the satellite gateway 12). Then, the satellite gateway 12 (or the VSAT 16) transports the NG interface CP packets and the NG interface UP packets with the reconstructed transport layer headers over the satellite communications link 20 (step S16). Since the reconstructed transport layer headers are configured as having a smaller data size than the SCTP, UDP and IP headers of the terrestrial IP packets, this does not use up extra satellite bandwidth, which results in efficient use of the satellite bandwidth.

Referring back to FIG. 1, in the illustrated embodiment, the satellite gateway 12 and the VSAT 16 implement 3GPP Core Network interface protocol between the Core Network 24 and the gNB 26 with local proxies (i.e., the NG-GW proxy 30 and the NG-VSAT proxy 40). For each user, the NG-GW proxy 30 (or the NG-VSAT proxy 40) extracts the control and user plane contexts and QoS parameters for PDU sessions (e.g., user sessions), and provides the extracted information to the packet scheduler 32 (or packet scheduler 42) for scheduling packets over the satellite communications link 20.

Specifically, in the illustrated embodiment, the packet scheduler 32 (or packet scheduler 42) schedules the packets for the PDU sessions using the QoS parameters per 3GPP specifications. This helps satellite network overcome the deficiency identified above and brings the satellite packet transport in sync with the terrestrial network QoS needs. This helps manage satellite bandwidth efficiently considering end user QoS need and data sessions.

In the illustrated embodiment, the satellite gateway 12 (e.g., the NG-GW proxy 30) continuously monitors the UE contexts, the PDU sessions as they setup and release, and uses the information to determine uplink and downlink satellite bandwidth both at the satellite gateway 12 and the VSAT 16. The satellite gateway 12 (e.g., the bandwidth manager 36) adjusts allocated satellite bandwidth for the VSAT 16 as the PDU sessions setup and release.

In the illustrated embodiment, the satellite MAC and PHY layer resource 34 and the bandwidth manager 36 of the satellite gateway 12 and the satellite MAC and PHY layer resources 44 of the VSAT 16 can be operated in relatively conventional manner as understood in the field of the satellite communication, and thus will not be described in detail for the sake of brevity. Furthermore, the NG-GW proxy 30 and the packet scheduler 32 of the satellite gateway 12 and the NG-VSAT proxy 40 and the packet scheduler 42 of the VSAT 16 can be configured as existing satellite MAC and PHY layer resources, respectively. The NG-GW proxy 30 and the packet scheduler 32 of the satellite gateway 12 and the NG-VSAT proxy 40 and the packet scheduler 42 of the VSAT 16 can be enabled for the satellite backhaul deployments while rest of the satellite communications network is simultaneously supporting non-backhaul services.

In the illustrated embodiment, the NG-GW proxy 30 of the satellite gateway 12 and the NG-VSAT proxy 40 of the VSAT 16 establish control plane connections (i.e., SCTP associations) locally with the Core Network 24 and the gNB 26, respectively, and then reconstruct transport layer headers, respectively, locally for data plane packets using the user and data plane contexts extracted for each user. This approach helps the satellite gateway 12 (e.g., the NG-GW proxy 30) and the VSAT 16 (e.g., the NG-VSAT proxy 40) remove the SCTP, UDP and IP headers from the terrestrial IP packets, and transport the payloads with the reduced or compressed headers (i.e., reconstructed transport layer headers) just necessary for sending the packets to the peer terrestrial node.

Figure 5:
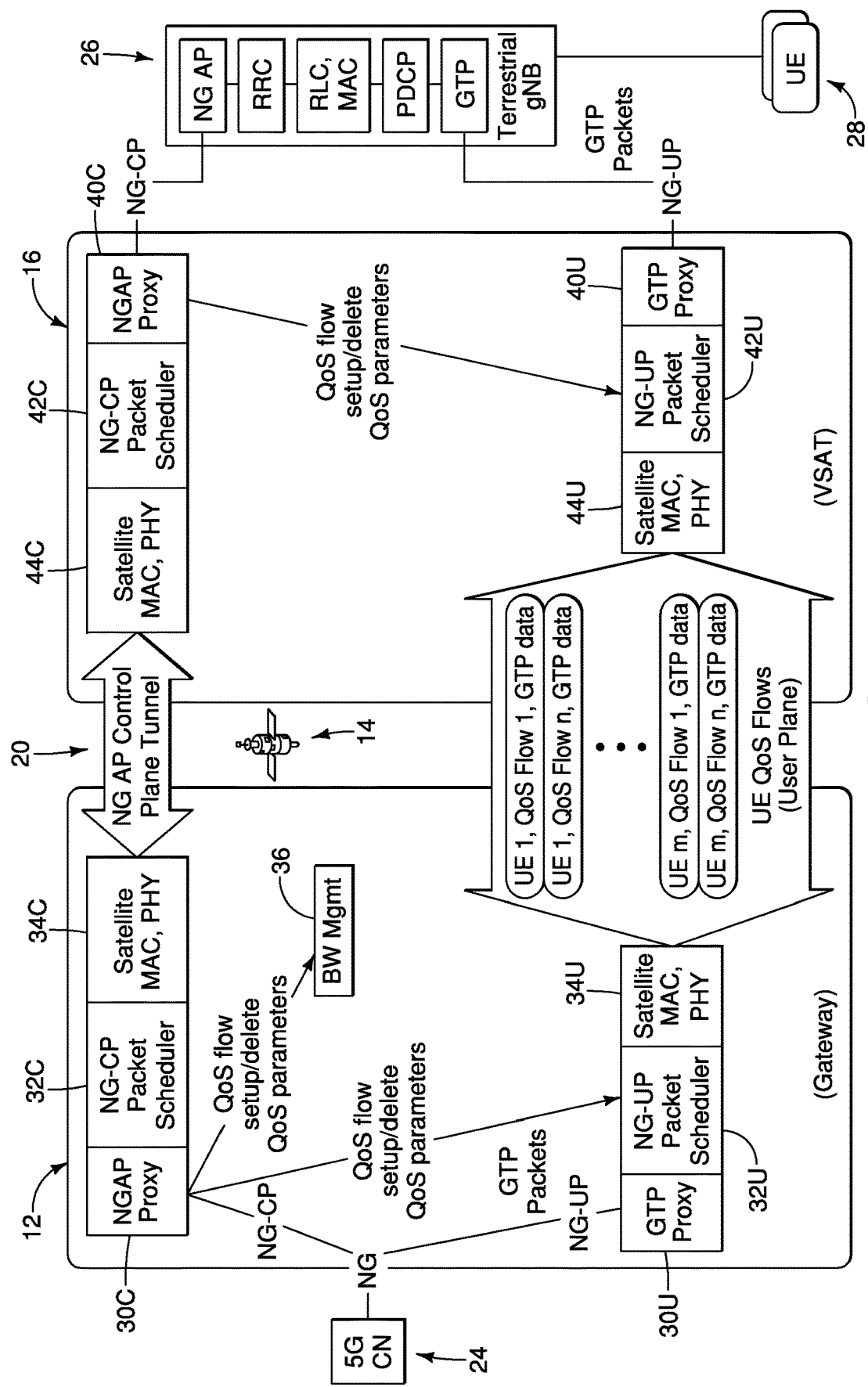
FIG. 5 illustrates a detailed configuration of the communication system illustrated in FIG. 1.

Referring now to FIG. 5, the detailed configuration of the communication system 10 will be described. As illustrated in FIG. 5, the NG-GW proxy 30 of the satellite gateway 12 has an NGAP proxy 30C in control plane and a GTP proxy 30U in user plane, while the NG-VSAT proxy 40 of the VSAT 16 has an NGAP proxy 40C in control plane and a GTP proxy 40U in user plane. Also, the packet scheduler 32 of the satellite gateway 12 has an NG-CP packet scheduler 32C in control plane and an NG-UP packet scheduler 32U in user plane, while the packet scheduler 42 of the VSAT 16 has an NG-CP packet scheduler 42C in control plane and an NG-UP packet scheduler 42U in user plane. Also, the satellite MAC and PHY layer resource 34 of the satellite gateway 12 has a satellite MAC and PHY layer resource 34C in control plane and a satellite MAC and PHY layer resource 34U in user plane, while the satellite MAC and PHY layer resource 44 of the VSAT 16 has a satellite MAC and PHY layer resource 44C in control plane and a satellite MAC and PHY layer resource 44U in user plane. With this configuration, as illustrated in FIG. 5, an NGAP control plane tunnel can be established between the satellite gateway 12 and the VSAT as a satellite control plane, while UE QoS flows can be established between the satellite gateway 12 and VSAT as a satellite user plane. As also illustrated in FIG. 5, the gNB 26 supports NGAP, GTP, RRC (Radio Resource Control), PDCP (Packet Data Convergence Protocol), RLC (Radio Link Control) and MAC (Medium Access Control) as terrestrial network layers and traffic.

The NGAP proxies 30C and 40C maintain the Core Network 24, the gNB 26 and the UE control and user plane contexts as explained in sequence diagrams later. The NGAP Proxies 30C and 40C provide the QoS parameters to the NG-UP packet schedulers 32U and 42U, respectively, for scheduling user plane packets. The NGAP proxy 30C of the satellite gateway 12 also provides QoS flow setup/release information and QoS parameters to the bandwidth manager 36 to adjust required uplink and downlink satellite bandwidth for the satellite gateway 12 and the VSAT 16. In response, the bandwidth manager 36 adjusts the satellite bandwidth based on active UE sessions.

Generally, control plane packets need relatively low bandwidth compared to user plane GTP PDU traffic. Thus, dedicated satellite bandwidth can be assigned for carrying the control plane packets between the satellite gateway 12 and the VSAT 16 with highest priority. Alternatively, as session details for UEs are available at the NGAP Proxies 30C and 40C, then the satellite bandwidth for the control plane packets can be predicted and adjusted dynamically.

Referring now to FIGS. 6 to 10, NGAP Procedures performed over the communications network 22 between the Core Network 24 and the gNB 26 via the satellite communications link 20 will be described. In the illustrated embodiment, while transporting the NG interface CP packets over the satellite communications link 20 for the NGAP Procedures, the reduced or compressed headers of the present disclosure is utilized as explained above.

Figure 6:
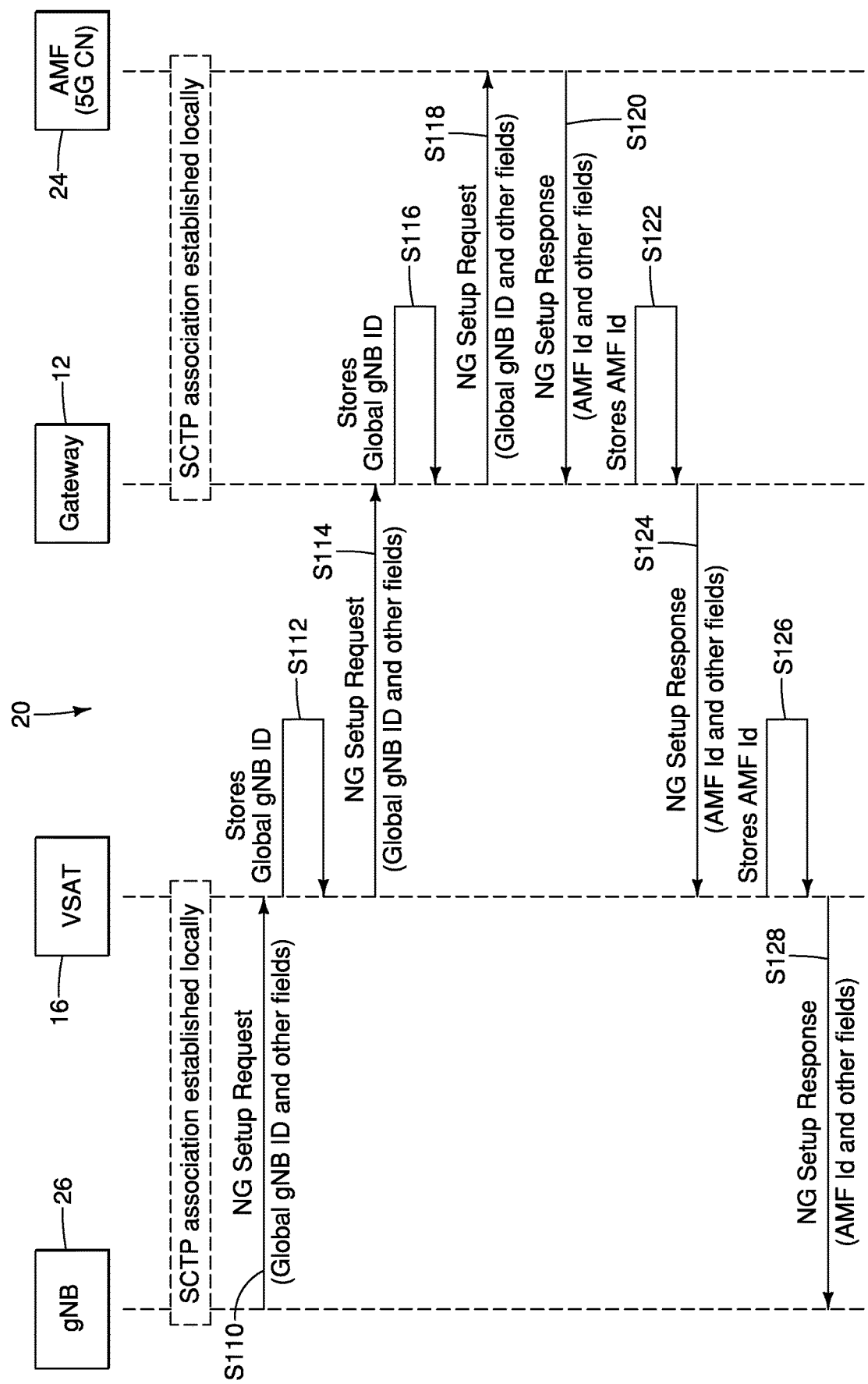
FIG. 6 illustrates a sequence diagram showing NG Setup Procedures of the communication system.

FIG. 6 illustrates a sequence chart of NG Setup Procedures of the communication system 10. The purpose of the NG Setup Procedures is to exchange application level data needed for the gNB 26 and the Core Network 24 (AMF) to correctly incorporate on the NG interface.

Referring to FIG. 6, the NGAP proxy 30C of the satellite gateway 12 establishes SCTP association with the AMF entity of the Core Network 24, while the NGAP proxy 40C of the VSAT 16 establishes the SCTP association with the gNB 26. IP addresses needed for establishing the SCTP associations is pre-configured at the satellite gateway 12 and the VSAT 16 by the satellite network service provider.

After establishing the SCTP association, the Core Network 24 and the gNB 26 exchange identity information with each other. As shown in FIG. 6, the VSAT 16 and the satellite gateway 12 store gNB identifier (global gNB identifier) and AMF identifier retrieved from the NG Setup Request message and the NG Setup Response message, respectively. The gNB and AMF identifiers are used to tag the NG interface packet payload sent over the satellite communications link 20, and then are sent on the SCTP association established locally at the receiving node, i.e. the satellite gateway 12 or the VSAT 16.

More specifically, as illustrated in FIG. 6, the gNB 26 initiates the procedures by sending the NG Setup Request message including the gNB identifier and other fields to the VSAT 16 over the SCTP association (step S110). The NGAP proxy 40C of the VSAT 16 receives the NG Setup Request message, and stores the gNB identifier in the NG Setup Request message in a computer memory of the VSAT 16 (step S112). The NGAP proxy 40C of the VSAT 16 generates the NG interface CP packets with the reduced or compressed headers to send the NG Setup Request message over the satellite communications link 20 (step S114). The NGAP proxy 30C of the satellite gateway 12 receives the NG interface CP packets sent over the satellite communications link 20, and stores the gNB identifier in the NG Setup Request message in a computer memory of the satellite gateway 12 (step S116). The NGAP proxy 30C of the satellite gateway 12 sends the NG Setup Request message to the Core Network 24 (AMF) over the SCTP association (step S118).

In response, the Core Network 24 (AMF) sends the NG Setup Response message including the AMF identifier and other fields to the satellite gateway 12 over the SCTP association (step S120). The NGAP proxy 30C of the satellite gateway 12 receives the NG Setup Response message, and stores the AMF identifier in the NG Setup Response message in the computer memory of the satellite gateway 12 (step S122). The NGAP proxy 30C of the satellite gateway 12 generates the NG interface CP packets with the reduced or compressed headers to send the NG Setup Response message over the satellite communications link 20 (step S124). The NGAP proxy 40C of the VSAT 16 receives the NG interface CP packets sent over the satellite communications link 20, and stores the AMF identifier in the NG Setup Response message in the computer memory of the VSAT 16 (step S126). The NGAP proxy 40C of the VSAT 16 sends the NG Setup Response message to the gNB 26 over the SCTP association (step S128), which completes the NG Setup Procedures.

Referring now to FIGS. 7 to 10, UE session management performed over the communications network 22 between the Core Network 24 and the gNB 26 via the satellite communications link 20 will be described.

Basically, the NGAP proxy 30C of the gateway 12 extracts UE control and user plane context from NG Interface packets. It maintains CN (Core Network) and gNB assigned UE identifiers (AMF & gNB NGAP UE IDs), PDU sessions and QoS flows active for a UE and QoS parameters associated with each QoS flow. This information is provided to the bandwidth manager 36 to adjust allocated uplink and downlink satellite bandwidth for the VSAT 16. The QoS parameters are also provided to the packet scheduler 32U of the gateway 12 for scheduling packets over the satellite communications link 20. The NGAP proxy 30C of the gateway 12 continuously monitors the setup and release of the UE context, the PDU session and QoS flows, and adjusts the satellite bandwidth needed for the VSAT 16.

Figure 7:
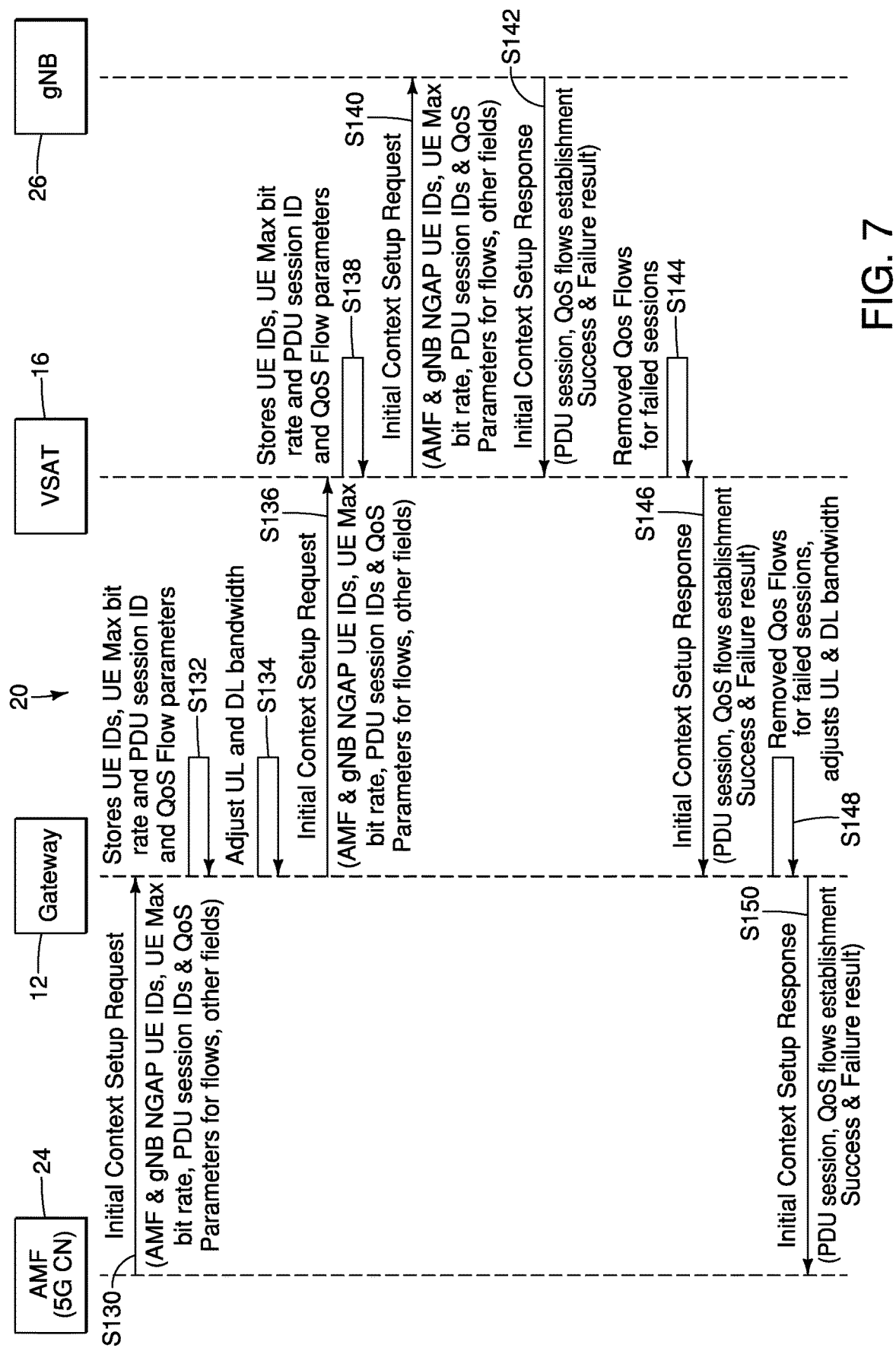
FIG. 7 illustrates a sequence diagram showing UE Initial Context Setup Procedures of the communication system.

FIG. 7 illustrates a sequence chart of UE Initial Context Setup Procedures of the communication system 10. The purpose of the UE Initial Context Setup Procedures is to establish the necessary overall initial UE context at the gNB 26.

Referring to FIG. 7, the Core Network 24 uses the UE Initial Context Setup Procedures to establish necessary context at the gNB for a UE. The Initial Context Setup Request message contains AMF and gNB assigned UE identifiers (AMF & gNB NGAP UE IDs) and UE PDU session context including QoS flows and QoS parameters associated with each QoS flow.

In the illustrated embodiment, the NGAP proxy 30C of the satellite gateway 12 and the NGAP proxy 40C of the VSAT 16 store the QoS parameters and the PDU session information obtained from the Initial Context Setup Request message. The gNB 26 reports success or failure for each PDU session in Initial Context Setup Response message. If the gNB 26 fails to setup a PDU session, then the NGAP proxy 40C of the VSAT 16 and the NGAP proxy 30C of the satellite gateway 12 delete the failed session information according to the Initial Context Setup Response message, and updates or adjust the satellite bandwidth and the scheduling of the packets accordingly.

More specifically, as illustrated in FIG. 7, the Core Network 24 (AMF) initiates the procedures by sending the Initial Context Setup Request message including the AMF and gNB assigned UE identifiers (AMF & gNB NGAP UE IDs), UE maximum bit rate, PDU session identifiers, QoS parameters for QoS flows and other fields to the gateway 12 (step S130). The NGAP proxy 30C of the satellite gateway 12 receives the Initial Context Setup Request message, and stores the UE identifiers, the UE maximum bit rate, the PDU session identifiers and the QoS parameters for QoS flows in the computer memory of the satellite gateway 12 (step S132). Furthermore, this information is provided to the bandwidth manager 36 to adjust the uplink and downlink satellite bandwidth (step S134). The NGAP proxy 30C of the satellite gateway 12 generates the NG interface CP packets with the reduced or compressed headers to send the Initial Context Setup Request message over the satellite communications link 20 (step S136). The NGAP proxy 40C of the VSAT 16 receives the NG interface CP packets sent over the satellite communications link 20, and stores the UE identifiers, the UE maximum bit rate, the PDU session identifiers and the QoS parameters for QoS flows in the Initial Context Setup Request message in the computer memory of the VSAT 16 (step S138). The NGAP proxy 40C of the VSAT 16 sends the Initial Context Setup Request message to the gNB 26 (step S140).

In response, the gNB 26 sends the Initial Context Setup Response message including success or failure result for PDU session and QoS flows establishment to the VSAT 16 (step S142). The NGAP proxy 40C of the VSAT 16 receives the Initial Context Setup Response message, and removes a QoS flow for failed session (step S144). The NGAP proxy 40C of the VSAT 16 generates the NG interface CP packets with the reduced or compressed headers to send the Initial Context Setup Response message over the satellite communications link 20 (step S146). The NGAP proxy 30C of the satellite gateway 12 receives NG interface CP packets sent over the satellite communications link 20. The NGAP proxy 30C of the satellite gateway 12 removes a QoS flow for failed session and this information is provided to the bandwidth manager 36 to adjust the uplink and downlink satellite bandwidth (step S148). The NGAP proxy 30C of the satellite gateway 12 sends the Initial Context Setup Response message to the Core Network 24 (AMF) (step S150), which completes the UE Initial Context Setup Procedures.

Figure 8:
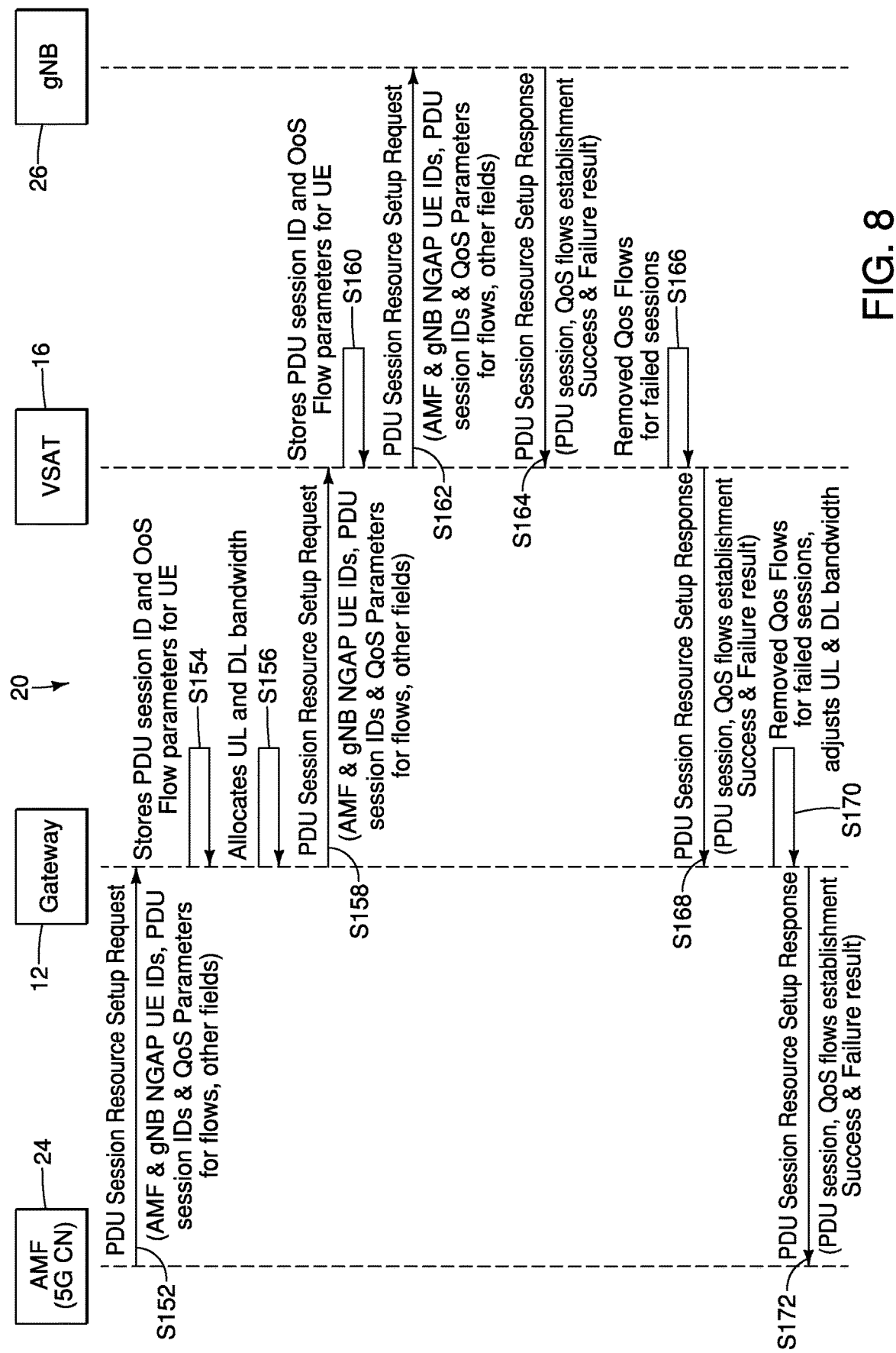
FIG. 8 illustrates a sequence diagram showing PDU Session Resource Setup Procedures of the communication system.

FIG. 8 illustrates a sequence chart of PDU Session Resource Setup Procedures of the communication system 10. The PDU Session Resource Setup Procedures is used to assign resources for additional PDU sessions that are established after the UE Initial Context Setup Procedures. The PDU Session Resource Setup Request message contains AMF and gNB assigned UE identifiers (AMF & gNB NGAP UE IDs) and PDU session context including QoS flows and QoS parameters associated with each QoS flow.

In the illustrated embodiment, the NGAP proxy 30C of the satellite gateway 12 and the NGAP proxy 40C of the VSAT 16 store the QoS parameters and the PDU session information obtained from the PDU Session Resource Setup Request message, and delete any failed sessions based on the PDU Session Resource Setup Response message. This information is used to allocate uplink and downlink satellite bandwidth and to schedule packets over the satellite communications link 20.

More specifically, as illustrated in FIG. 8, the Core Network 24 (AMF) initiates the procedures by sending the PDU Session Resource Setup Request message including the AMF and gNB assigned UE identifiers (AMF & gNB NGAP UE IDs), the PDU session identifiers, the QoS parameters for QoS flows and other fields to the gateway 12 (step S152). The NGAP proxy 30C of the satellite gateway 12 receives the PDU Session Resource Setup Request message, and stores the PDU session identifiers and the QoS flow parameters for a UE in the computer memory of the satellite gateway 12 (step S154). Furthermore, this information is provided to the bandwidth manager 36 to allocate the uplink and downlink satellite bandwidth (step S156). The NGAP proxy 30C of the satellite gateway 12 generates the NG interface CP packets with the reduced or compressed headers to send the PDU Session Resource Setup Request message over the satellite communications link 20 (step S158). The NGAP proxy 40C of the VSAT 16 receives the NG interface CP packets sent over the satellite communications link 20, and stores the PDU session identifiers and the QoS flow parameters for a UE in the PDU Session Resource Setup Request message in the computer memory of the VSAT 16 (step S160). The NGAP proxy 40C of the VSAT 16 sends the PDU Session Resource Setup Request message to the gNB 26 (step S162).

In response, the gNB 26 sends the PDU Session Resource Setup Response message including success or failure result for PDU session and QoS flows establishment to the VSAT 16 (step S164). The NGAP proxy 40C of the VSAT 16 receives the PDU Session Resource Setup Response message, and removes QoS flows for failed session (step S166). The NGAP proxy 40C of the VSAT 16 generates the NG interface CP packets with the reduced or compressed headers to send the PDU Session Resource Setup Response message over the satellite communications link 20 (step S168). The NGAP proxy 30C of the satellite gateway 12 receives NG interface CP packets sent over the satellite communications link 20. The NGAP proxy 30C of the satellite gateway 12 removes QoS flows for failed session, and this information is provided to the bandwidth manager 36 to adjust the uplink and downlink satellite bandwidth (step S170). The NGAP proxy 30C of the satellite gateway 12 sends the PDU Session Resource Setup Response message to the Core Network 24 (AMF) (step S172), which completes the PDU Session Resource Setup Procedures.

Figure 9:
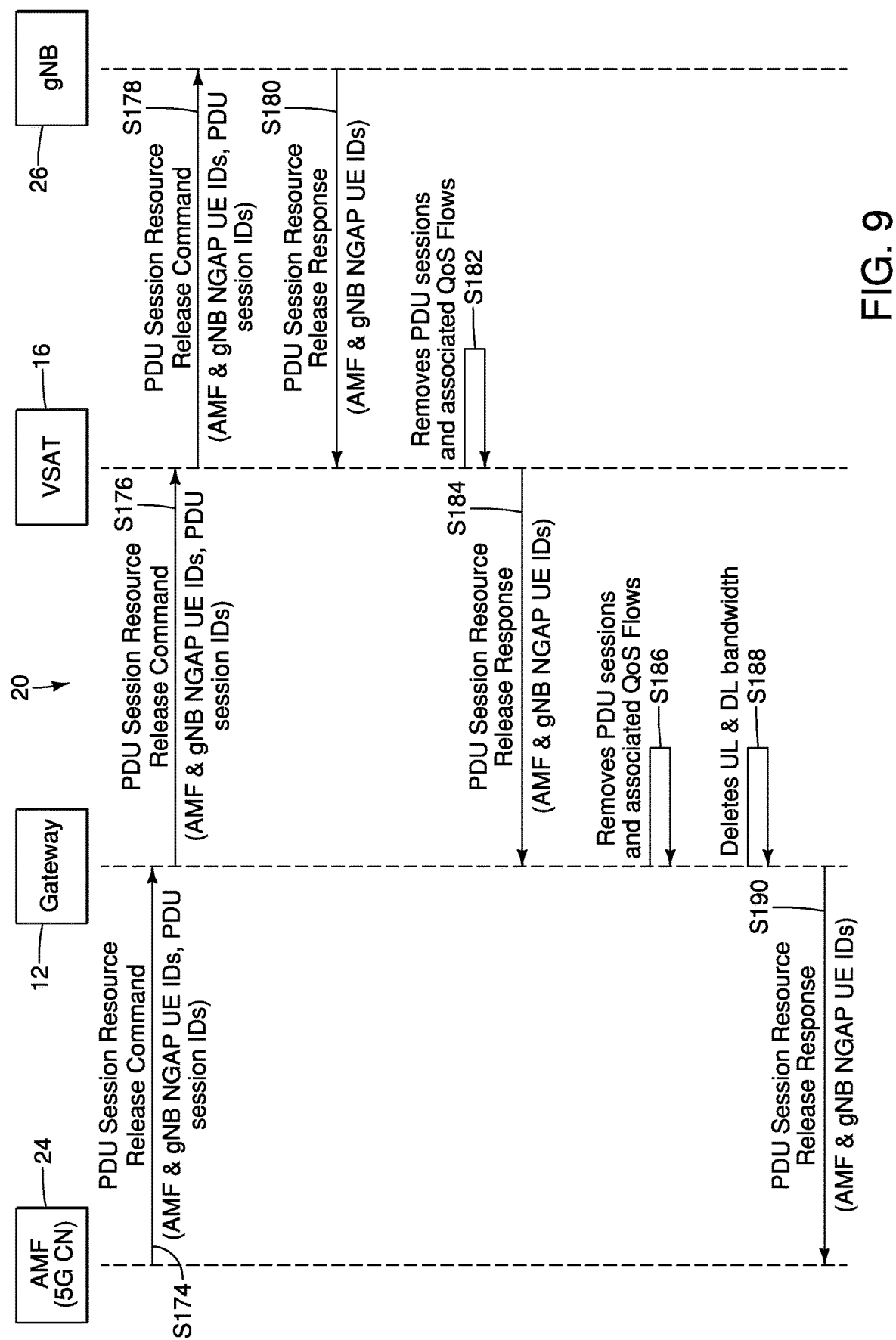
FIG. 9 illustrates a sequence diagram showing PDU Session Resource Release Procedures of the communication system.

FIG. 9 illustrates a sequence chart of PDU Session Resource Release Procedures of the communication system 10. The PDU Session Resource Release Procedures is used to release one or more PDU sessions and associated radio resources.

In the illustrated embodiment, the NGAP proxy 30C of the satellite gateway 12 and the NGAP proxy 40C of the VSAT 16 forward a PDU Session Resource Release Command message to the gNB 26. The satellite gateway 12 and the VSAT 16 deletes PDU sessions and QoS flows after receiving a PDU Session Resource Release Response message from the gNB 26. The satellite gateway 12 also deletes uplink and downlink satellite bandwidth associated with the PDU sessions.

More specifically, as illustrated in FIG. 9, the Core Network 24 (AMF) initiates the procedures by sending the PDU Session Resource Release Command message including the AMF and gNB assigned UE identifiers (AMF & gNB NGAP UE IDs) and the PDU session identifiers (step S174). The NGAP proxy 30C of the satellite gateway 12 receives the PDU Session Resource Release Command message, and generates the NG interface CP packets with the reduced or compressed headers to send the PDU Session Resource Release Command message over the satellite communications link 20 (step S176). The NGAP proxy 40C of the VSAT 16 receives the NG interface CP packets sent over the satellite communications link 20, and sends the PDU Session Resource Release Command message to the gNB 26 (step S178).

In response, the gNB 26 sends the PDU Session Resource Release Response message including the AMF and gNB assigned UE identifiers (AMF & gNB NGAP UE IDs) to the VSAT 16 (step S180). The NGAP proxy 40C of the VSAT 16 receives the PDU Session Resource Release Response message, and removes the PDU sessions and associated QoS flows (step S182). The NGAP proxy 40C of the VSAT 16 generates the NG interface CP packets with the reduced or compressed headers to send the PDU Session Resource Release Response message over the satellite communications link 20 (step S184). The NGAP proxy 30C of the satellite gateway 12 receives the NG interface CP packets sent over the satellite communications link 20. The NGAP proxy 30C of the satellite gateway 12 removes the PDU sessions and associated QoS flows (step S186), and this information is provided to the bandwidth manager 36 to delete the uplink and downlink satellite bandwidth (step S188). The NGAP proxy 30C of the satellite gateway 12 sends the PDU Session Resource Release Response message to the Core Network 24 (AMF) (step S190), which completes the PDU Session Resource Release Procedures.

Figure 10:
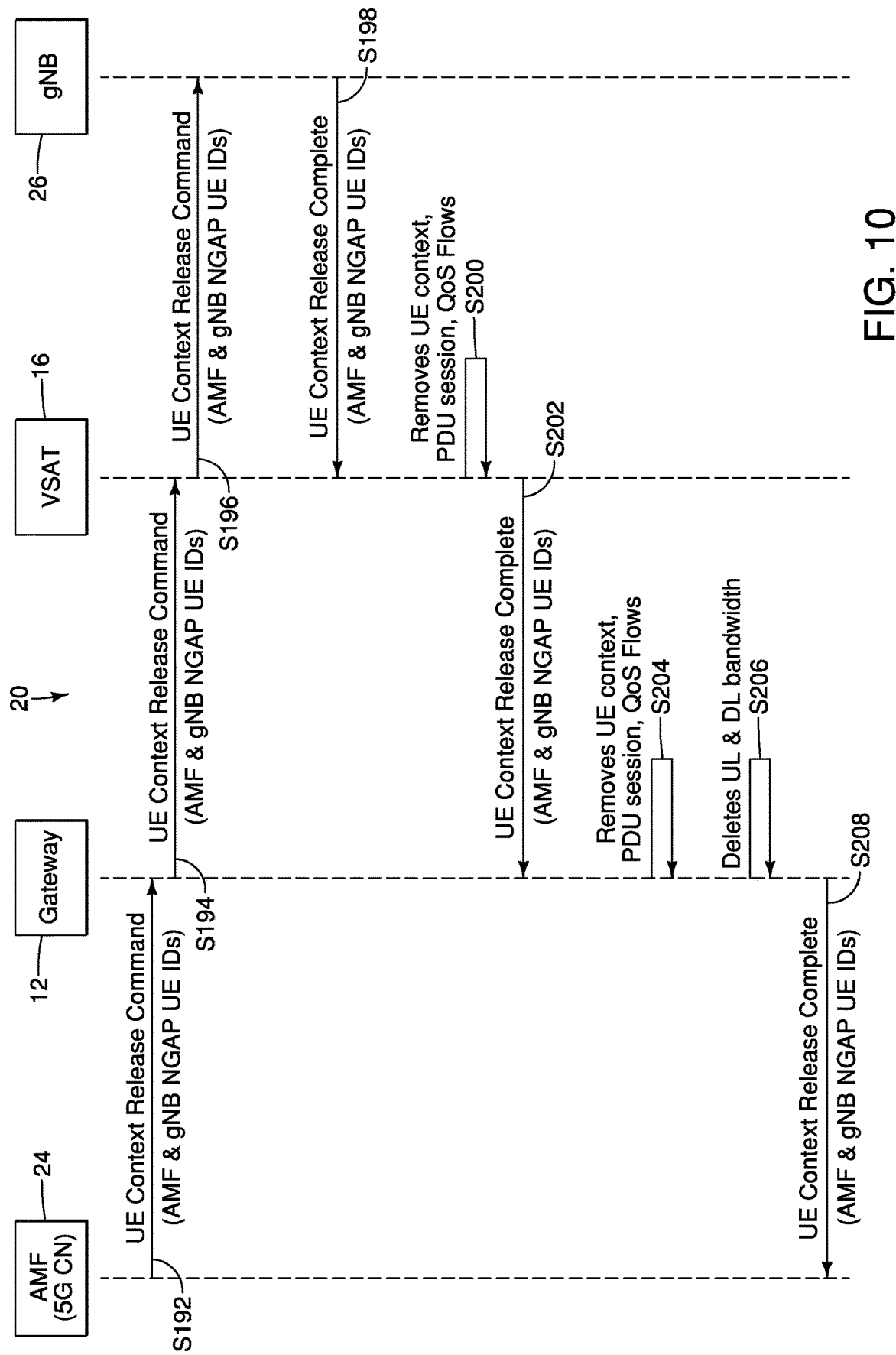
FIG. 10 illustrates a sequence diagram showing UE Context Release Procedure of the communication system.

FIG. 10 illustrates a sequence chart of UE Context Release Procedures of the communication system 10. The UE Context Release Procedures is used to release user plane and control plane resources associated with a UE.

In the illustrated embodiment, the NGAP proxy 30C of the satellite gateway 12 and the NGAP proxy 40C of the VSAT 16 forward a UE Context Release Command message to the gNB 26. The satellite gateway 12 and the VSAT 16 deletes PDU sessions, QoS flows and UE control plane context after receiving a UE Context Release Complete message from the gNB 26. The satellite gateway 12 also deletes uplink and downlink satellite bandwidth associated with the UE.

More specifically, as illustrated in FIG. 10, the Core Network 24 (AMF) initiates the procedures by sending the UE Context Release Command message including the AMF and gNB assigned UE identifiers (AMF & gNB NGAP UE IDs) (step S192). The NGAP proxy 30C of the satellite gateway 12 receives the UE Context Release Command message, and generates the NG interface CP packets with the reduced or compressed headers to send the UE Context Release Command message over the satellite communications link 20 (step S194). The NGAP proxy 40C of the VSAT 16 receives the NG interface CP packets sent over the satellite communications link 20, and sends the UE Context Release Command message to the gNB 26 (step S196).

In response, the gNB 26 sends the UE Context Release Complete message including the AMF and gNB assigned UE identifiers (AMF & gNB NGAP UE IDs) to the VSAT 16 (step S198). The NGAP proxy 40C of the VSAT 16 receives the UE Context Release Complete message, and removes UE context, PDU sessions and QoS flows (step S200). The NGAP proxy 40C of the VSAT 16 generates the NG interface CP packets with the reduced or compressed headers to send the UE Context Release Complete message over the satellite communications link 20 (step S202). The NGAP proxy 30C of the satellite gateway 12 receives the NG interface CP packets sent over the satellite communications link 20. The NGAP proxy 30C of the satellite gateway 12 removes the UE context, the PDU sessions and the QoS flows (step S204), and this information is provided to the bandwidth manager 36 to delete the uplink and downlink satellite bandwidth (step S206). The NGAP proxy 30C of the satellite gateway 12 sends the UE Context Release Complete message to the Core Network 24 (AMF) (step S208), which completes the UE Context Release Procedures.

Referring further to FIG. 4, user plane sent over the satellite communications link 20 will be explained. The Core Network 24 and the gNB 26 send user plane packets for a UE data stream using UP transport layer identifiers TEID (Tunnel Endpoint Identifier) and QFI (QoS Flow Indicator). The TEID and the QFI uniquely identify packets associated with a QoS stream.

The GTP proxy 30U of the satellite gateway 12 and the GTP proxy 40U of the VSAT 16 extract the TEID and the QFI from the user plane packets, and provides UP payload along with the TEID and QFI to the NG-UP packet scheduler 32U of the satellite gateway 12 and the NG-UP packet scheduler 42U of the VSAT 16, respectively. The NG-UP packet schedulers 32U and 42U use the TEID, the QFI and the QoS parameters included in the control plane packets and received from the NGAP proxies 30C and 40C, respectively, to schedule the user plane packets (NG interface UP packets), respectively, over the satellite communications link 20. The NG-UP packet schedulers 32U and 42U update the PDU session context and the QoS parameters for each UE, respectively, as the PDU sessions are setup and released.

The QoS parameters provide session type, such as guaranteed (GBR) or not-guaranteed (non-GBR), bandwidth requirement and ARP (Allocation Retention Priority). The ARP provides relative priority and preemption information for a QoS flow. For GBR traffic, the ARP can be used to determine whether a new flow can be admitted or rejected in case of bandwidth limitation. For non-GBR traffic, ARP preemption information may be used by the satellite gateway 12 to preempt low priority sessions over higher priority sessions in case of satellite bandwidth limitation.

The satellite gateway 12 and the VSAT 16 send the TEID, the QFI and the UP packet payload to the terrestrial nodes (the Core Network 24 and the gNB 26) on terrestrial NG interface, respectively.

Figure 11:
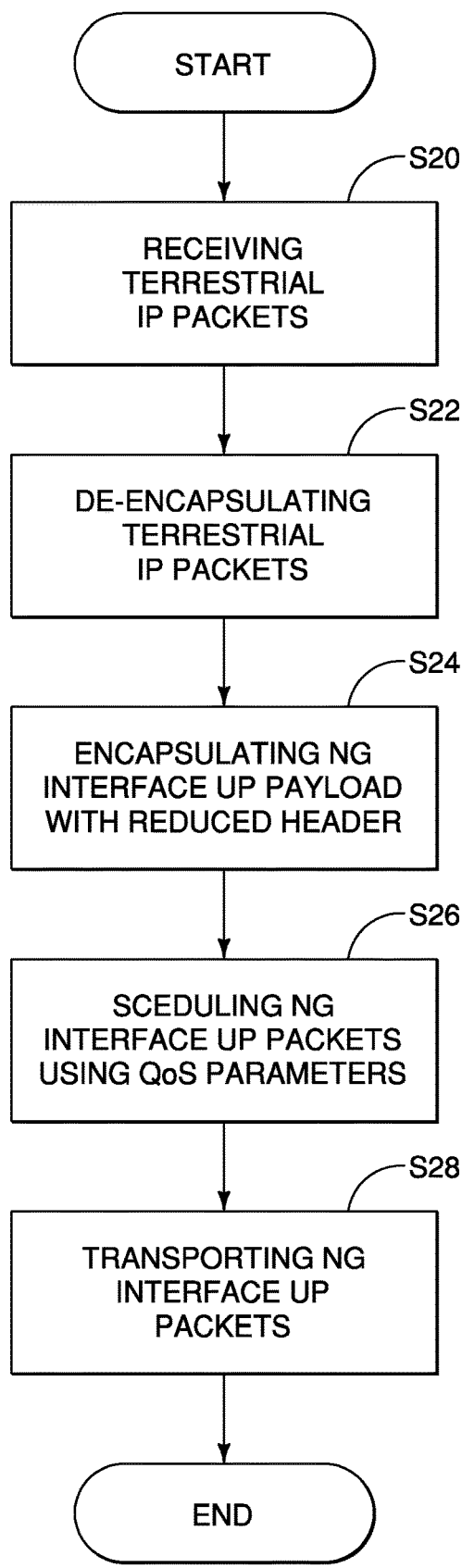
FIG. 11 illustrates a flowchart of a communication method of the communication system for transporting the NG interface UP packets over the satellite communications link considering QoS parameters.
Figure 12:
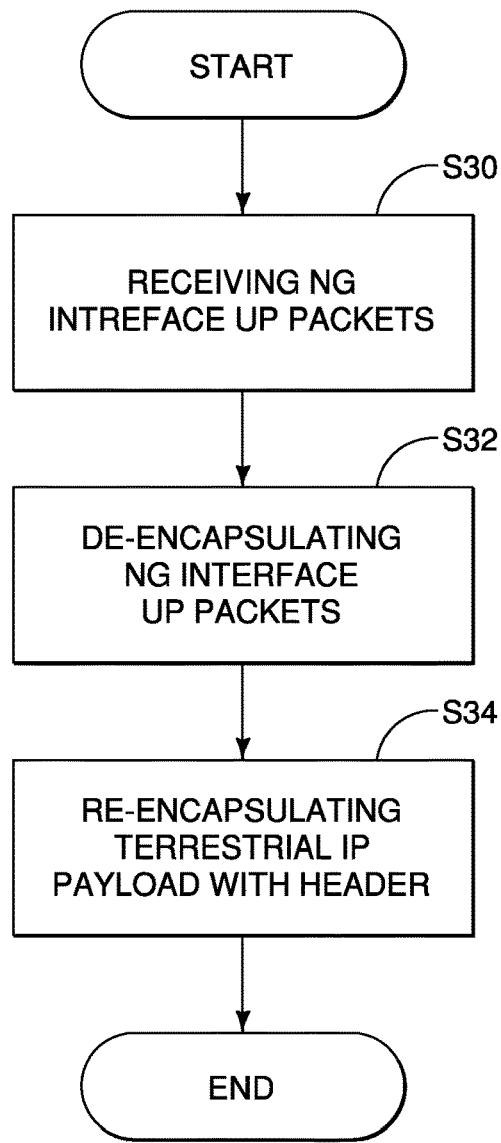
FIG. 12 illustrates a flowchart of the communication method of the communication system for receiving the NG interface UP packets over the satellite communications link.

FIG. 11 illustrates a flowchart of a communication method of the communication system 10 for transporting the NG interface UP packets over the satellite communications link 20 considering the QoS parameters. FIG. 12 illustrates a flowchart of the communication method of the communication system for receiving the NG interface UP packets over the satellite communications link 20.

Specifically, as illustrated in FIG. 11, the NG-GW proxy 30 of the satellite gateway 12 (or the NG-VSAT proxy 40 of the VSAT 16) receives the terrestrial IP packets (e.g., a stream of terrestrial data packets) that are encapsulated in accordance with the 3GPP specifications (e.g., a predetermined protocol) (step S20). The NG-GW proxy 30 of the satellite gateway 12 (or the NG-VSAT proxy 40 of the VSAT 16) de-encapsulates the terrestrial IP packets (step S22). Specifically, the NG-GW proxy 30 of the satellite gateway 12 (or the NG-VSAT proxy 40 of the VSAT 16) strips the GTP, UDP and IP headers (e.g., the header information) from the terrestrial IP packets. Also, the NG-GW proxy 30 of the satellite gateway 12 (or the NG-VSAT proxy 40 of the VSAT 16) extracts the QoS parameter from the control plane packets of the terrestrial IP packets by the NGAP proxy 30C (or the NGAP proxy 40C) (e.g., the control plane proxy).

The NG-GW proxy 30 of the satellite gateway 12 (or the NG-VSAT proxy 40 of the VSAT 16) encapsulates the NG interface UP payload with reduced header (step S24). In particular, the NG-GW proxy 30 of the satellite gateway 12 (or the NG-VSAT proxy 40 of the VSAT 16) encapsulates the user plane context within the NG interface UP packets (e.g., the satellite data packets). Specifically, the NG-GW proxy 30 of the satellite gateway 12 (or the NG-VSAT proxy 40 of the VSAT 16) adds to the user plane context header information having a smaller data size than the GTP, UDP and IP headers (e.g., the header information) that has been stripped from the terrestrial IP packets. The packet scheduler 32 of the satellite gateway 12 (or the packet scheduler 42 of the VSAT 16) uses the QoS parameters associated with the QoS flows for scheduling the NG interface UP packets (step S26). The satellite gateway 12 (or the VSAT 16) (e.g., the first node) transports the NG interface UP packets to the VSAT 16 (or the satellite gateway 12) (e.g., the second node) via the satellite communications link 20 between the satellite gateway 12 and the VSAT 16 (step S28). Specifically, the NG interface UP packets are transported over the satellite communications link 20 per US QoS parameters.

In response, as illustrated in FIG. 12, the NG-VSAT proxy 40 of the VSAT 16 (or the NG-GW proxy 30 of the satellite gateway 12) receives the NG interface UP packets via the satellite communications link 20 (step S30). The NG-VSAT proxy 40 of the VSAT 16 (or the NG-GW proxy 30 of the satellite gateway 12) de-encapsulates the NG interface UP packets to extract the user plane context (step S32). The NG-VSAT proxy 40 of the VSAT 16 (or the NG-GW proxy 30 of the satellite gateway 12) re-encapsulates terrestrial IP packet payload with header (step S34). Specifically, the NG-VSAT proxy 40 of the VSAT 16 (or the NG-GW proxy 30 of the satellite gateway 12) re-encapsulates the user plane context within the terrestrial IP packets in accordance with the 3GPP specifications.

With the communication system 10, the following advantages can be achieved, for example.

With the communication system 10, a cellular backhaul considering end user QoS parameters can be provided and a terrestrial NodeB interface can be extended over the satellite communications link 20.

With the communication system 10, the user plane packets can be scheduled over the satellite communications link 20 considering individual user terrestrial network QoS parameters and per 3GPP specifications. Specifically, the satellite gateway 12 and the VSAT 16 can use end user QoS parameters provided by the terrestrial Core Network 24 to determine the satellite bandwidth and schedule end user PDUs per QoS parameters. Thus, scheduling of the traffic over the satellite communications link 20 can be performed independent from the DSCP marking.

With the communication system 10, the uplink and downlink satellite bandwidth can be allocated dynamically based on the terrestrial QoS parameters and the PDU sessions.

With the communication system 10, the terrestrial packet payload can be transported over the satellite communications link 20 with the reduced header, which can conserve the satellite bandwidth.

With the communication system 10, as the local proxy (e.g., the NG-GW proxy 30 or the NG-VSAT proxy 40) processes the terrestrial control plane and user plane packets separately, the proxy can determine the satellite bandwidth for the control plane traffic dynamically and the packet scheduler (e.g., the packet scheduler 32 or 42) can schedule the control plane packets with higher priority over the user plane traffic.

With the communication system 10, in case of satellite bandwidth limitation, the PDU sessions can optionally be rejected or preempted per the preemption parameters provide by the terrestrial Core Network 24.

With the communication system 10, the satellite gateway 12 and the VSAT 16 do not need to implement 3GPP RRC (Radio Resource Control), PDCP (Packet Data Convergence Protocol), RLC (Radio Link Control) and MAC (Medium Access Control) layers that a typical 3GPP gNB normally supports.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A communication system comprising:
   a first node of a satellite communications network; and
   a second node of the satellite communications network, the second node being configured to link with the first node via a satellite communications link between the first node and the second node, the first node configured to link with the second node using control plane satellite bandwidth for a control plane of the satellite communications link and user plane satellite bandwidth for a user plane of the satellite communications link, the first node including
      a proxy device configured to receive a stream of terrestrial data packets that are encapsulated in accordance with a predetermined protocol, configured to de-encapsulate the terrestrial data packets to extract control plane context, user plane context and QoS parameters for a user session in accordance with the predetermined protocol, and configured to encapsulate the control plane context and the user plane context within satellite data packets,
      a bandwidth manager configured to adjust the control plane satellite bandwidth for the control plane of the satellite communications link using the QoS parameters,
      a packet scheduler configured to schedule the satellite data packets using the QoS parameters that have been extracted and provided to the packet scheduler of the first node in accordance with the predetermined protocol, and
      a transmitter configured to transmit the satellite data packets including the control plane context to the second node via the control plane of the satellite communications link and the satellite data packets including the user plane context to the second node via a user plane of the satellite communications link according to a scheduling result by the packet scheduler.

2. The communication system according to claim 1, wherein the second node includes
   a proxy device configured to receive the satellite data packets via the satellite communications link, configured to de-encapsulate the satellite data packets to extract the user plane context, and configured to re-encapsulate the user plane context within terrestrial data packets in accordance with the predetermined protocol.

3. The communication system according to claim 2, wherein
   the proxy device of the first node includes a proxy device of one of a satellite gateway and a VSAT (Very Small Aperture Terminal), and
   the proxy device of the second node includes a proxy device of the other one of the satellite gateway and the VSAT.

4. The communication system according to claim 3, wherein
   the proxy device of the satellite gateway supports a network interface with a terrestrial core network, and
   the proxy device of the VSAT supports a network interface with a terrestrial base station.

5. The communication system according to claim 2, wherein
   the proxy devices of the first and second nodes each include a control plane proxy and a user plane proxy, and
   the control plane proxy of the first node is configured to extract the QoS parameters from control plane packets of the terrestrial data packets.

6. The communication system according to claim 1, wherein
   the proxy device of the first node is configured to de-encapsulate the terrestrial data packets by stripping header information from the terrestrial data packets, and configured to encapsulate the user plane context within the satellite data packets by adding to the user plane context header information having a smaller data size than the header information that has been stripped from the terrestrial data packets.

7. The communication system according to claim 6, wherein
   the header information that has been stripped from the terrestrial data packets includes SCTP (Stream Control Transmission Protocol) header, UDP (User Datagram Protocol) header and IP (Internet Protocol) header.

8. The communication system according to claim 1, wherein
   the predetermined protocol is 3GPP core network interface protocol.

9. A communication method comprising:
   receiving, by a first node of a satellite communications network, a stream of terrestrial data packets that are encapsulated in accordance with a predetermined protocol, the first node configured to link with a second node via a satellite communications link using control plane satellite bandwidth for a control plane of the satellite communications link and user plane satellite bandwidth for a user plane of the satellite communications link;
   de-encapsulating, by the first node, the terrestrial data packets to extract control plane context, user plane context and QoS parameters for a user session in accordance with the predetermined protocol;

encapsulating, by the first node, the control plane context and the user plane context within satellite data packets;

adjusting, by a bandwidth manager at the first node using the QoS parameters, the control plane satellite bandwidth for the control plane of the satellite communications link;

scheduling, by a packet scheduler at the first node using the QoS parameters, satellite data packets including the user plane context for transmission via the user plane of the satellite communications link;

transmitting, by the first node, the satellite data packets including the control plane context to the second node of the satellite communications network via the control plane of the satellite communications link; and transmitting, by the first node, the satellite data packets including the user plane context to the second node of the satellite communications network via the user plane of the satellite communications link.

10. The communication method according to claim 9, wherein
the de-encapsulating of the terrestrial data packets includes stripping header information from the terrestrial data packets, and
the encapsulating of the user plane context within the satellite data packets includes adding to the user plane context header information having a smaller data size than the header information that has been stripped from the terrestrial data packets.

11. The communication method according to claim 10, wherein
the header information that has been stripped from the terrestrial data packets includes SCTP (Stream Control Transmission Protocol) header, UDP (User Datagram Protocol) header and IP (Internet Protocol) header.

12. The communication method according to claim 9, wherein
the first node includes a proxy device of one of a satellite gateway and a VSAT (Very Small Aperture Terminal), and
the second node includes a proxy device of the other one of the satellite gateway and the VSAT.

13. The communication method according to claim 12, wherein
the proxy device of the satellite gateway supports a network interface with a terrestrial core network, and
the proxy device of the VSAT supports a network interface with a terrestrial base station.

14. The communication method according to claim 9, further comprising:
receiving, by the second node, the satellite data packets via the satellite communications link;
de-encapsulating, by the second node, the satellite data packets to extract the user plane context; and
re-encapsulating, by the second node, the user plane context within terrestrial data packets in accordance with the predetermined protocol.

15. The communication method according to claim 9, wherein
the predetermined protocol is 3GPP core network interface protocol.

16. The communication method according to claim 9, wherein
the de-encapsulating of the terrestrial data packets includes extracting the QoS parameters from control plane packets of the terrestrial data packets by a control plane proxy of the first node.

17. A communication method comprising:
receiving, by a first node of a satellite communications network, a stream of terrestrial data packets that are encapsulated in accordance with a predetermined protocol, the first node forming a gateway for one of a terrestrial core network and a terrestrial base station that is linked to the terrestrial core network via the satellite communications network, the first node configured to link with a second node via a satellite communications link using control plane satellite bandwidth for a control plane of the satellite communications link and user plane satellite bandwidth for a user plane of the satellite communications link, the second node forming a gateway for the other one of the terrestrial core network and the terrestrial base station;

de-encapsulating, by the first node, the terrestrial data packets to extract payload information by stripping at least one transport layer header;

encapsulating, by the first node, the payload information within satellite data packets by adding to the payload information at least one reconstructed transport layer header having a smaller data size than the at least one transport layer header that has been stripped from the terrestrial data packets;

adjusting, by a bandwidth manager at the first node using QoS parameters, the control plane satellite bandwidth for the control plane of the satellite communications link;

scheduling, by a packet scheduler at the first node using QoS parameters, satellite data packets for the user plane of the satellite communications link;

transmitting, by the first node, the satellite data packets including control plane context to the second node of the satellite communications network via the control plane of the satellite communications link; and transmitting, by the first node, the satellite data packets including user plane context to the second node of the satellite communications network via the user plane of the satellite communications link.

18. The communication method according to claim 17, comprising
dynamically adjusting the control plane satellite bandwidth.

19. The communication method according to claim 17, comprising
scheduling satellite data packets including control plane context with higher priority over satellite data packets including user plane context.

20. A communication system comprising:
a first node of a satellite communications network, the first node forming a gateway for one of a terrestrial core network and a terrestrial base station that is linked to the terrestrial core network via the satellite communications network; and
a second node of the satellite communications network, the second node being configured to link with the first node via a satellite communications link between the first node and the second node, the second node forming a gateway for the other one of the terrestrial core network and the terrestrial base station, the first node configured to link with the second node using control plane satellite bandwidth for a control plane of the satellite communications link and user plane satellite bandwidth for a user plane of the satellite communications link, the first node including
- a proxy device configured to receive a stream of terrestrial data packets that are encapsulated in accordance with a predetermined protocol, configured to de-encapsulate the terrestrial data packets to extract payload information by stripping at least one transport layer header, and configured to encapsulate the payload information within satellite data packets by adding to the payload information at least one reconstructed transport layer header having a smaller data size than the at least one transport layer header that has been stripped from the terrestrial data packets,
- a bandwidth manager configured to adjust the control plane satellite bandwidth for the control plane of the satellite communications link using QoS parameters,
- a packet scheduler configured to schedule satellite data packets using QoS parameters, and
- a transmitter configured to transmit the satellite data packets including control plane context to the second node via the control plane of the satellite communications link and to transmit the satellite data packets including user plane context to the second node via the user plane of the satellite communications link.

* * * * *